United States Patent [19]

Shiber

[11] 3,941,225

[45] Mar. 2, 1976

[54] SPEED LIMITING ACCESSORY DRIVE SYSTEM AND APPARATUS THEREFOR

[75] Inventor: Samuel Shiber, Mundelein, Ill.

[73] Assignee: MacLean-Fogg Lock Nut Company, Mundelein, Ill.

[22] Filed: May 20, 1974

[21] Appl. No.: 471,432

[52] U.S. Cl.... 192/104 C; 192/103 B; 192/105 BA; 192/113 B; 192/110 B
[51] Int. Cl.² .................................... F16D 43/14
[58] Field of Search......... 192/104 C, 104 B, 103 B, 192/113 B, 105 BA, 48.3, 110 B, 82 T

[56] References Cited
UNITED STATES PATENTS

| | | | |
|---|---|---|---|
| 1,018,476 | 2/1912 | Bostater | 192/104 B |
| 1,286,171 | 11/1918 | Cory | 192/113 B |
| 2,090,401 | 8/1937 | Mayo | 192/82 T |
| 2,506,520 | 5/1950 | Spase | 192/104 C |
| 2,793,537 | 5/1957 | Schmitter | 192/48.3 X |
| 2,924,083 | 2/1960 | Spase | 192/104 B |
| 2,974,770 | 3/1961 | Branch et al. | 192/104 C |
| 3,081,856 | 3/1963 | Wolfram et al. | 192/104 C |
| 3,131,797 | 5/1964 | Bochan | 192/103 B |
| 3,229,795 | 1/1966 | Hill et al. | 192/104 C |

FOREIGN PATENTS OR APPLICATIONS

| | | | |
|---|---|---|---|
| 1,209,719 | 9/1959 | France | 192/104 C |

*Primary Examiner*—Benjamin W. Wyche
*Attorney, Agent, or Firm*—McCaleb, Lucas & Brugman

[57] ABSTRACT

A speed-limiting accessory drive system and apparatus therefor for the transmission of torque and diversion and dissipation of excess energy from a prime mover, such as liquid-cooled internal combustion engine, to a cluster of accessories associated therewith utilizing a speed-responsive mechanism wherein the mechanism is comprised of two drum-shaped driving and driven members which simultaneously provide bearing journalling support and frictional engagement one with the other. One form of the invention utilizes a centrifugally partially disengaging speed-responsive mechanism so that regardless of the driving members speed above a predetermined control speed, the driven member is substantially maintained at that control speed thereby driving the accessories at a desired maximum speed. Another form of the invention utilizes a centrifugally engaging speed-responsive mechanism whereby the mechanism remains effectively disengaged at the cranking speeds of the engine, but engages at idling speeds for driving the accessories. Noise suppression for the system as well as lubrication and heat dissipation of the speed responsive mechanism are provided by circulation of the engine's coolant throughout the sealed speed-responsive mechanism.

13 Claims, 6 Drawing Figures

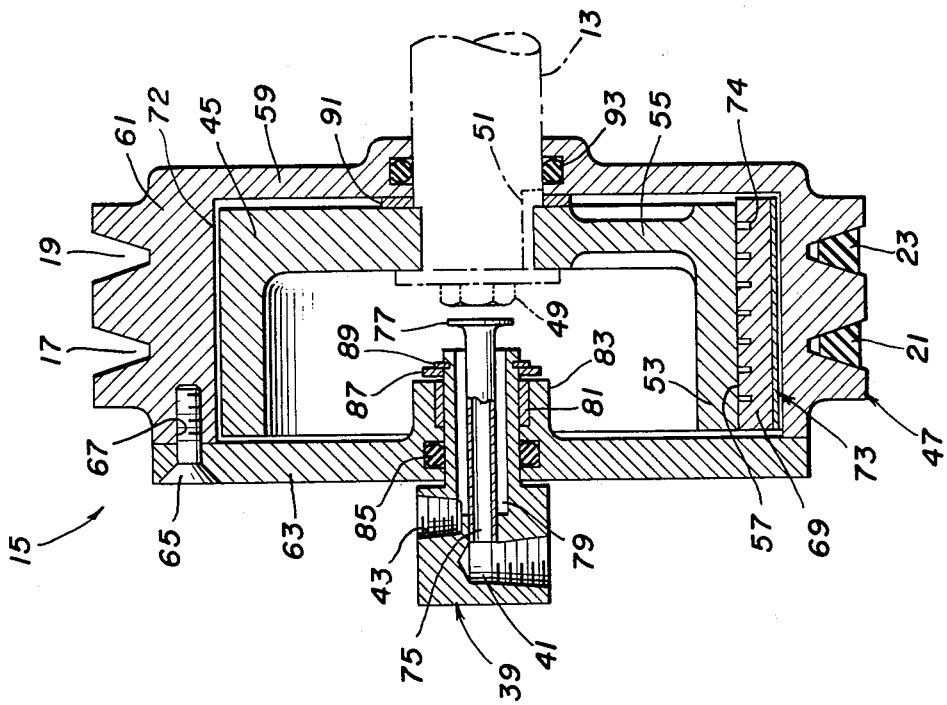
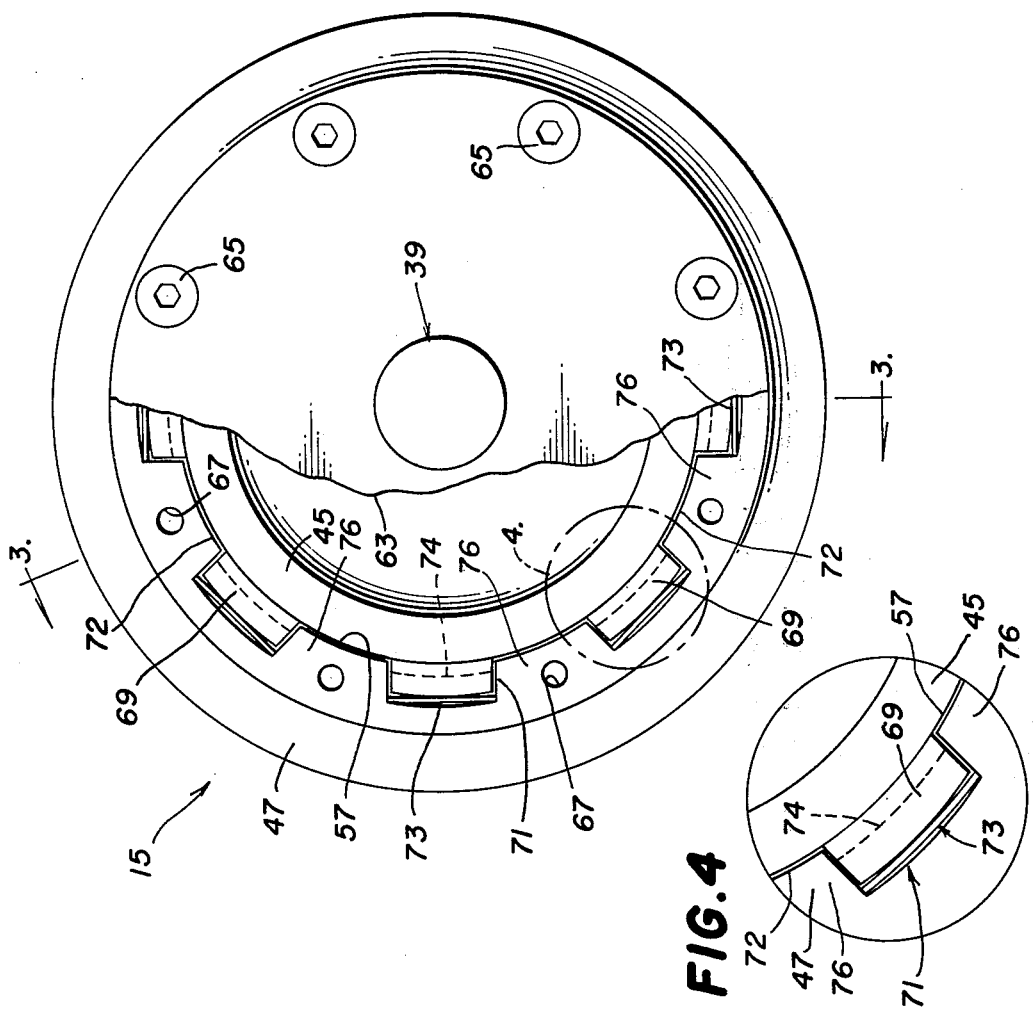

U.S. Patent March 2, 1976 Sheet 3 of 3 3,941,225
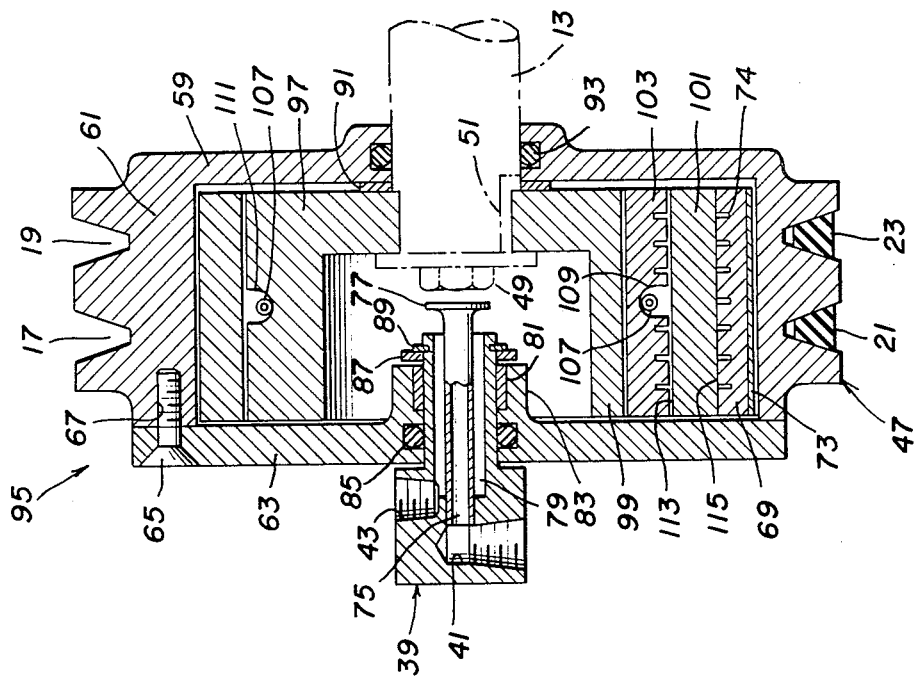
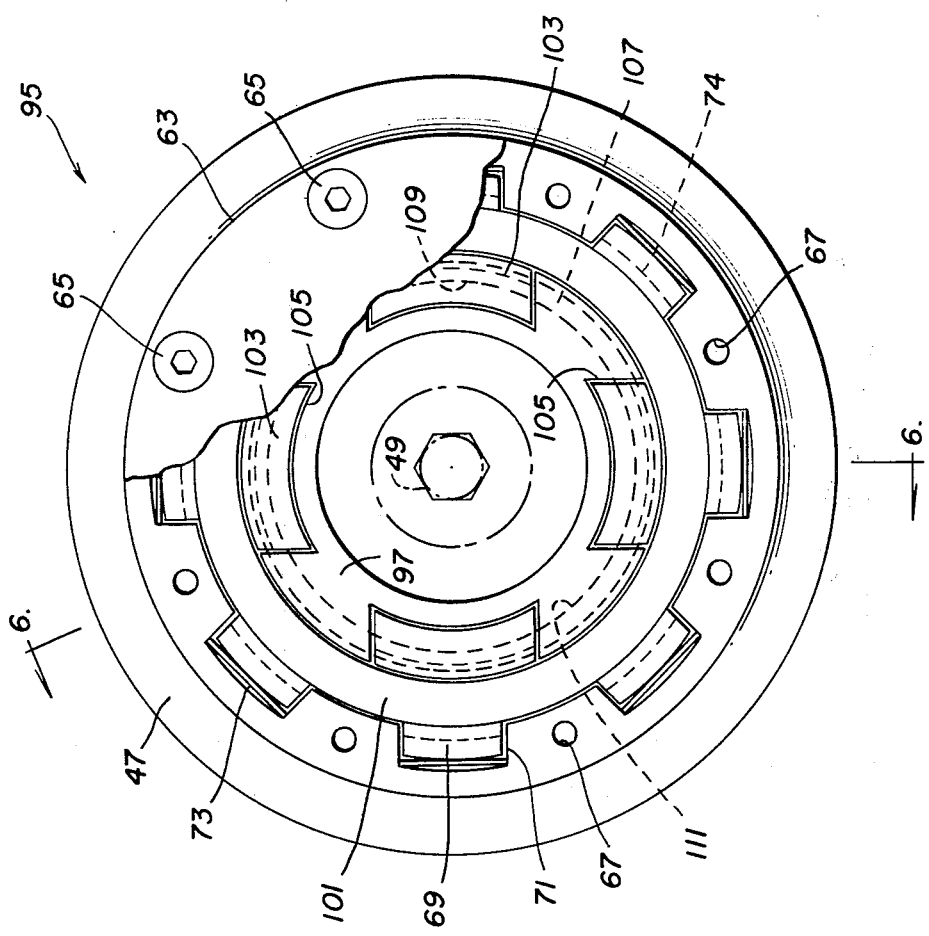

SPEED LIMITING ACCESSORY DRIVE SYSTEM AND APPARATUS THEREFOR

BACKGROUND OF THE INVENTION

1. Field of the Invention

This invention relates to speed limiting accessory drive systems and apparatus therefor and more particularly to speed-responsive mechanisms for the transmission of torque and diversion of excess energy in speed-limiting accessory drive systems utilized with prime movers such as liquid cooled internal combustion engines.

Modern day car and truck engines are loaded with a cluster of belt-driven accessories including water pumps, fans, air conditioning compressors, air compressors, power steering pumps, alternators, and exhaust gas recirculation pumps. Increasing consumer usage of such accessories on the one hand, and the fact that the accessories must give sufficient output at both engine idling and highway cruising speeds on the other hand, requires a wide, yet economical, performance range for the complete accessory drive system. In conventional drive systems, accessories are driven at speeds proportional to the engine speed and demand a sizeable portion of the engine's power output. Accordingly, accessories to be used in conventional systems must be designed to give sufficient accessory output at low engine speed yet be able to withstand high rotational speeds without prematurely deteriorating and even bursting. With the present invention, smaller capacity accessories can be utilized to give equivalent or better performance than that obtained with present drive systems and present accessories. By operating accessories through a drive system which limits the maximum accessory speed and therefore limits the torque to a value below that that would have been normally required to drive the accessories above that maximum accessory speed, the economical and functional performance of the engine is less penalized. If the accessory speed is not limited, then during high speed engine operation the majority of the accessories produce excessive output and require excessive drive torque which respectively compromises useful accessory life and represents a continuous power loss of several horsepower to the engine. This power loss appears in the form of reduced engine performance coupled with increased fuel consumption and increased wear in the accessories and accessory drive system.

A preferred relation between the speed of the driving engine and the accessories is to build up the accessory speed at a high rate during lower engine speeds but to limit the accessory speed to a maximum control level when the engine speed exceeds that level. In this manner, sufficient drive is assured for accessory operation at low engine speeds as well as at cruising speeds, yet the accessory drive system which limits accessory speed diverts the excessive engine-delivered energy to the engine's cooling system rather than passing it to the accessories.

Prior attempts to improve the relationship between the engine speed and the accessory speed employing such devices as multi-speed transmissions or infinitely variable transmissions between the engine and accessories have not proven commercially acceptable. Inherent performance deficiencies and cost penalties have made these devices commercially unfeasible. Certain accessory drive systems known in the art have utilized torque transmission mechanisms in which centrifugal weights effect frictional disengagement, however, specific problems such as excessive noise and wear in the clutch facing have prevented their broad commercial implementation. Some air cooled accessory drive mechanisms known in the art require costly heat exchangers which are difficult to manufacture and result in insufficient air circulation. Moreover, providing air-cooled devices with a fan blade heat exchanger resulted in wasted energy, thus further lowering overall engine performance. Because many prior art devices required accommodation for friction pad wear and did not have direct and substantially complete bearing journalling support provided by and between the driven and driving members, complex bearing arrangements were necessary, resulting in increased overall costs. Devices of the prior art typifying the foregoing problems are illustrated in the following patents: U.S. Pat. Nos. 1,365,733; 2,746,587; 2,758,689; 3,081,856; 3,747,731.

The present invention has as one of its more important objects, the provision of a speed-limiting accessory drive system in which the accessory speed is increased by a high drive ratio at lower engine speeds and then limited at a maximum control speed regardless of increased engine speeds beyond that control speed.

This invention has as another object the provision of a speed-limiting accessory drive system in which heat dissipation, lubrication, and noise suppression are provided by circulation of presently available liquid coolants from a liquid cooled internal combustion engine throughout the speed-responsive, torque-transmitting mechanism of the drive system.

A further object of this invention is the provision of speed-limiting accessory drive system utilizing a speed-responsive, torque-transmitting mechanism which avoids the deliverance of excessive engine-delivered energy to the accessories and permits reduced design capacity for the accessory equipment.

A still further object of this invention is the provision of a self-journalling speed-responsive mechanism in an accessory drive system wherein the driven member is substantially completely journalled for bearing support by the driving member thereby eliminating the need for complex bearing arrangements.

Still another object of this invention is the provision of a speed-limiting accessory drive system which reduces the rotary torque necessary to drive the accessories and thereby increases overall engine performance.

Another object of this invention is the provision of an accessory drive system wherein at engine cranking speeds, the associated accessories are disengaged thereby reducing the torque required to start and turn over the engine.

SUMMARY OF THE INVENTION

The present invention relates to a speed-limiting accessory drive system for a liquid cooled internal combustion engine in which noise suppression, lubrication and heat dissipation are obtained by circulation of the engine's liquid coolant throughout the speed-responsive mechanism of the drive system. Particularly, one form of the speed-limiting accessory drive system of this invention utilizes a centrifugally partially disengaging, speed-responsive mechanism to transmit power from an internal combustion engine to the associated accessories wherein the accessories' speeds are limited at a desired maximum level regardless of the engine speed in excess of that maximum level. Accordingly, the various accessories can be of reduced design capacity since they are not required to accommodate higher engine speeds. A second form of this invention combines the partially disengaging mechanism above referred to with a centrifugally engaging, speed-responsive mechanism so that at engine cranking speeds, the accessories are only minimally driven or not driven by the engine. The fact that the speed-responsive mechanism of the second form of this invention does not fully engage the engine to the accessories until higher idling and cruising speeds are reached is advantageous in that at cranking speeds, there is no requirement for the engine starting mechansim to transmit full operating torque to the accessories. This second form functions similar to the first form during the higher engine speeds.

The centrifugally operable speed-responsive mechanism of either form of this device consists of a generally drum-shaped driving member which is adapted to be connected to the output shaft of an internal combustion engine, and a driven member of a general drum shape displaced outwardly from the driving member for connection to the engine accessories by any common method such as belts and pulleys, by way of example. The driving member has a frictional member in the form of a peripheral drum against which the friction surfaces of mating friction elements carried by the driven member are urged into engagement by spring means to engage the mechanism. As the rotational speed of the speed-responsive mechanism increases due to the increasing speed of the driven member, the outwardly directed centrifugal forces developed in the frictional elements carried by the driven member oppose the inwardly directed spring forces until at a predetermined control speed, the mechanism starts to slip.

Liquid coolant from the engine's cooling system circulates throughout the speed-responsive mechanism of the speed-limiting drive system of this invention and acts to directly dissipate heat, lubricate, promote bearing journalling, and suppress noise generated by the mating frictional elements during controlled slipping engagement above the preselected control speed. Since the slippage in the mechanism occurs while the vehicle is cruising at a substantial speed whereat its engine's liquid cooling system is not fully utilized, it is expected that no additional radiator capacity would be required by using this invention, except for continued accessory use at extremely high cruising speeds. While the driving member's speed increases above the control speed and controlled slippage within the mechanism continues, the driving member transmits only a limited rotational speed to the driven member, the mechanism itself diverting the excessive engine-delivered energy to the cooling system of the associated engine. Consequently, this speed-limiting accessory drive system only allows the accessories to operate at a predetermined, maximum speed, thereby maximizing the engine's torque output required to drive the accessories. Moreover, even though the engine is driving the speed-responsive mechanism at an increased ratio during lower engine speed, the engine only has to drive the mechanism at this maximized required-torque.

The fact that the speed-limiting accessory drive system of this invention only requires the engine to drive the accessories at a maximized required-torque is a key element in this invention's ability to conserve an engine's power in spite of the fact that the speed-responsive mechansim of this invention is itself an energy diverting and dissipating mechanism. The torque required to drive the engine's fan and water pump increases approximately as the square of their driven speeds. Thus, at high accessory speeds, the fan and water pump torque is very substantial and dominates over the torque required by the other accessories. Furthermore, in an engine equipped with a conventional accessory drive system, the accessories are allowed to be driven at speeds proportional to the engine's speeds including speeds above the preselected control speed at which the accessories are held by the present invention. The combination of these two facts, i.e., a substantial required torque at high accessory speeds and a proportional speed driving relationship, results in a substantially increased torque necessary to drive the accessories at the high engine speeds. However, this increased required torque is merely wasted by the accessories since their output is adequate at the medium engine speeds. Accordingly, the torque penalty imposed on an engine equipped with a conventional drive system is substantially higher than an engine utilizing the present invention where the accessories' speeds are limited.

Further, since utilization of this invention reduces and limits the maximum speed level transmitted to the accessories, lower capacity accessories driven at a higher ratio can be utilized for space and cost savings as well as for smooth operation. A reduction in the rating of the torque transmission system such as belts and pulleys is another consequential benefit of this invention. Even through this invention permits a higher drive ratio thereby assuring sufficient accessory output at idle, overall accessory size can be reduced as mentioned above since limiting accessory speed eliminates concern over bursting accessories at unnecessarily high rotational speeds.

IN THE DRAWINGS:

FIG. 2 is a fragmentary front view of one embodiment of the speed-responsive mechanism of this invention with a portion of its front cover removed;

FIG. 3 is a cross sectional view of one embodiment of the present invention taken along line 3—3 of FIG. 2;

FIG. 4 is an enlarged view of a friction pad area encircled on FIG. 2;

FIG. 5 is a front view of another embodiment of the speed-responsive mechanism of this invention with its front cover removed;

FIG. 6 is a cross sectional view of the embodiment shown in FIG. 5 taken along line 6—6 of FIG. 5.

DESCRIPTION OF THE PREFERRED EMBODIMENT

Figure 1:
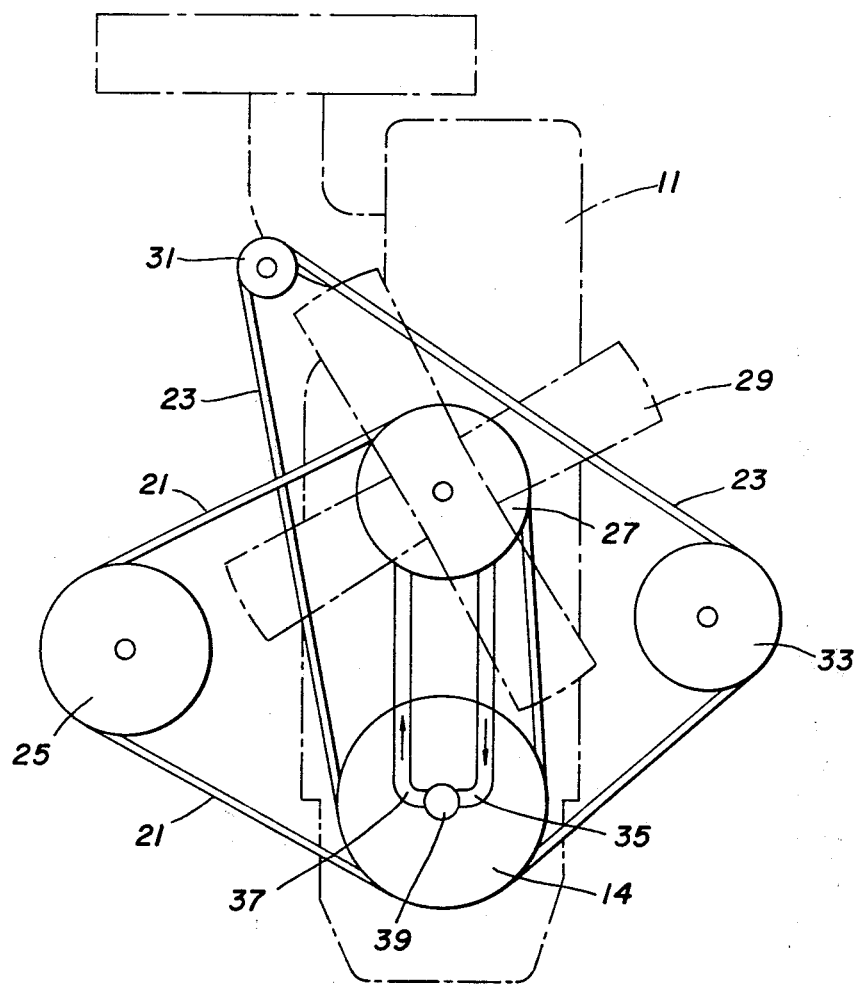
FIG. 1 is a schematic front view of an internal combustion engine equipped with a speed-limiting accessory drive system incorporating the present invention.

Referring to FIG. 1, there is schematically illustrated a liquid cooled internal combustion engine 11 having a cluster of accessories associated therewith. The speed-responsive mechanism of the speed-limiting accessory drive system of this invention, generally denoted by reference numeral 14, is rigidly secured to a crankshaft 13 as seen in FIG. 3, for transmission of torque and diversion and dissipation of excessive energy from the engine 11 to the accessories. Pulleys 17 and 19 are formed on the periphery of mechanism 14 within which belts 21 and 23, respectively, ride for transmission of torque from the mechanism to the various accessories. The belt 21 also passes over a pulley 25 for driving an air conditioning compressor connected thereto and also over a pulley 27 for driving the engine's water pump and fan 29. The belt 23 passes over a pulley 31 for driving an alternator and over a pulley 33 for driving the engine's power steering pump. It is to be understood that any rotary torque transmission means, other than belts and pulleys, can be utilized with the accessory drive system of this invention and, furthermore, that other engine accessories such as gas recirculation pumps, for example, can be added to the above described accessory drive system.

An inlet line 35 and a return line 37 connect the engine's cooling system to the mechanism 14 through a hydraulic coupler 39 having an inlet port 41 and an outlet port 43, as seen in FIG. 3. Preferably, the inlet line 35 ties in to the engine's cooling system at a point at which relatively high pressure and low temperature prevail so as to induce coolant circulation throughout the mechanism 14. Moreover, such a tie-in allows greatest heat dissipation between the mechanism 14 and the engine's cooling system. Alternative tie-in methods known in the art can be utilized to cause the rotating mechanism to induce circulation through itself thereby providing the mechanism with its own auxiliary coolant pump such that a closed circuit coolant system could be utilized to make this invention compatible with air-cooled engines.

Referring now to FIGS. 2 and 3, one embodiment of the speed-responsive mechanism of the speed-limiting accessory drive system of the present invention as indicated generally by numeral 15 has a driving member generally denoted by numeral 45 and a driven member generally denoted by numeral 47. The driving member 45 is rigidly affixed to the engine's crankshaft 13 by a bolt 49 and a key 51 thus providing a direct drive relationship between the engine 11 and the driving member 45. The driving member 45 comprises a generally drum-shaped peripheral section 53 and a radial section 55. The drum section 53 of the driving member 45 has an outer friction surface 57 for transferring tangential torque loads from the driving member 45 to the driven member 47 during relative frictional drive therebetween, and also for providing journalling to the driven member of the mechanism as described later herein. Outwardly displaced from the driving section 45 and adapted to be concentrically rotated therewith or relative thereto is the driven member 47 having a radial flange section or rear cover 59 and a peripheral drum-shaped, bearing-flange section 61, which has the sheaves or pulley grooves 17, 19 formed thereon. A front cover 63 is adapted to be connected to the bearing flange section 61 by any common method such as plural threaded fasteners 65 and tapped holes 67.

Interposed and entrapped between the bearing flange section 61 and the friction surface 57 are plural, arcuate-shaped friction pads 69. Each friction pad 69 is harbored within a retainer box or recess 71 formed on the interrupted inner cylindrical surface 72 of the driven member 47 so that when the friction pad 69 frictionally engages the surface 57, tangential torque loads are transmitted from the driving member 45 to the driven member 47. The importance of the fact that the combination of the driven member 47 and the plural friction pads 69 obtains direct bearing support from the driving member 45 will become understood as the description continues.

A resilient spring means, in the form of a compressed flat spring 73, is positioned within the retainer box 71 between the driven member 47 and each friction pad 69 for radially urging the pads 69 into direct frictional engagement with the friction surface 57 of the driving member 45. The friction surface 57 is preferably hardened steel or similar material and the friction pads 69 are preferably of a sintered metal with good bearing characteristics, especially when under liquid cooling and lubrication.

Referring now to FIG. 4, there are several force components acting on each entrapped friction pad 69 during rotation of mechanism 15, each component having varying magnitudes depending on the unit's rotational speed. A centrifugal force due to rotation of the driven member 47 of the mechanism 15 tends to outwardly displace each friction pad 69 in a radial direction, whereas the opposing inwardly directed spring force from its associated flat spring 73 tends to maintain the friction pad 69 in direct frictional non-slipping engagement with the friction surface 57. Tangential frictional drive forces developed between each pad 69 and the friction surface 57 are also present. A detailed description of the relationship between these various forces and the ability of the mechanism 15 to transmit the desired torque while limiting the overall accessory speeds will follow.

The inward energization force of the flat spring 73 and weight of a friction pad 69 are so designed that under all engine operational speeds, the resultant force acting on the friction pad 69 is inwardly directed so as to maintain frictional engagement between the latter and the driving member 45. Consequently, the limited output speed of the device (which is the speed of the driven member 47) will not exceed the predetermined maximum speed or design limit. This limited output speed may vary within a range of, for example, ±10% of the design output speed as the torque transmitted by the mechanism to the accessories from the engine crankshaft 13 varies.

Referring now to FIG. 3, it will be noted that through use of hydraulic coupler 39, liquid from the engine's cooling system is circulated throughout the mechanism 15. Various functions are performed by this liquid coolant such as dissipation of heat generated by the mating frictional surfaces during rotation of mechanism 15, lubrication of the various mating elements, assistance in the development of self-journalling between the driven and driving members, and reduction of noise emitted by the mechanism. The common combination of water, anti-freeze and rust prevention additives available from the engine's cooling system acts as a suitable lubricant when the above described preferred materials are used in this invention. As noted in FIG. 3, hydraulic coupler 39 directs coolant from inlet line 35 to the center regions of mechanism 15 through a cantilevered pipe 75 which has a flange 77 at its free end. Liquid coolant is directed out of the center regions of the mechanism 15 through a passage 79 and the outlet port 43. The hydraulic coupler 39 which is stationary is supported by a bushing 81 inserted within a bearing portion 83 of the front cover 63. A seal 85 prevents leakage of liquid coolant between the bearing portion 83 of the front cover 63 and the hydraulic coupler 39. A thrust washer 87 retained by a snap ring 89 maintains the hydraulic coupler 39 in a stationary seated position within the front cover 63. The rear cover 59 is spaced from the radial section 55 of the driving member 45 by a thrust washer 91 and is sealed around the crankshaft 13 by a seal 93. The combination of seals 85, 93, cover 63, and driven membver 47, thus create a sealed chamber or hermetically-sealed envelope about the driving member 45.

To prevent the formation of a hydrodynamic bearing between the mating frictional areas of the speed-responsive mechanism of the speed-limiting accessory drive system of this invention, plural grooves 74 are formed on the friction face of each of the plural friction pads 69, as seen in FIG. 4. These grooves prevent a hydrodynamic bearing from forming under the pads 69. This specific pattern of grooves also allows circumferential flow of the eninge's liquid coolant under the pads 69 thereby allowing sufficient fluid between the plural bearing portions 76 of the driven member 47 and the friction surface 57 of the driving member 45. The latter fact assists the creation of a hydrodynamic bearing between the bearing portions 76 and the surface 57, whereby relative journalling between the mating members of the mechanism 15 is established.

As can be noted in FIG. 3, there is no direct bearing journal support between the crankshaft 13 and the driven member 47. The direct or slipping frictional engagement between plural friction pads 69 carried by the driven member 47 and the friction surface 57 of the driving member 45 and the above-described hydrodynamic bearing formed between the plural bearing portions 76 and surface 57 provide substantially complete journalling support between the driven and driving members of the speed-responsive mechanism of this invention. This type of mating member journalling obviates the need for specialized bearing arrangements as required in the prior art speed-limiting accessory drive devices. Moreover, since all bearing surfaces are located within the mechanism's over-all housing (which serves as a hermetically sealed chamber for liquid coolant circulation), they are lubricated by the liquid coolant from the engine. It is to be understood that for heavy duty applications of the mechanism 15, such as in truck use, additional bearings (not shown) can be adapted to either or both ends of the mechanism 15 as seen in FIG. 3 to assure the compactness of the overall package size of the mechanism 15. The mechanism 15 would provide its own self-journalling without this modification, as above described, but the mating bearing areas of the mechanism 15 would have to be of sufficient length to assure adequate journalling support.

Turning now to a description of the operation of this form of the preferred embodiment as shown in FIGS. 2, 3 and 4, it will be noted that rotary torque is delivered to the peripheral section 53 of the driving member 45 through the crankshaft 13, key 51, and radial section 55. Due to the fact that plural flat springs 73 are assembled in a strained state and of sufficient strength, the mating clutch members of the mechanism 15 are always in an engaged condition once assembled. Since there is direct engagement between the friction pads 69 and the friction surface 57, rotation of the driving member 45 causes the rotary torque of the crankshaft 13 to be transmitted to the driven member 47. The rotary torque transmitted to the driven member 47 is in turn transmitted to the various engine accessories through the multiple belt and pulley arrangement above described. During the lower rotational speeds of the crankshaft 13, the driven member 47 rotates in synchronism with the driving member 45 due to relative direct frictional engagement therebetween. Thus, at cranking, idling, and the lower rotational engine speeds up to a predetermined control speed to be discussed later, the mechanism 15 operates as a locked or direct coupled unit.

During the relatively direct frictional engagement between the driving and driven members, a rotary torque delivered by the crankshaft 13 and required by the accessories is directly transmitted through the mechanism 15 to the various accessories. However, when controlled slippage begins to occur between the driven and driving members, the available rotary torque, still being directly delivered by the engine as required by the accessories, is transmitted by the mechanism 15 at the limited rotational speed, which never exceeds the maximum control speed. As noted previously, this limited speed may vary within a certain band as the torque required by the accessories varies due to accessory loads being changed. Controlled slipping frictional engagement occurs within the mechanism because of the previously described forces coacting on the friction pads 69. As the rotational speed of the driving member 45 is increased from a lower rotational speed to the desired control speed whereat the accessories are to be maintained, the centrifugal force developed on the friction pads 69 tends to oppose the inwardly directed engaging forces created by the compressed flat springs 73. As the rotational speed of the driving member 45 closely approaches and surpasses this control speed, the centrifugal forces on the plural pads 69 are of such a magnitude as to substantially counteract the engaging forces of the plural flat springs 73 so that direct frictional engagement is replaced by controlled slipping engagement. As noted above, the magnitude of the engaging force in compressed flat springs 73 is so designed that friction pads 69 are always biased against the friction surface 57. However, because of the above-mentioned counteraction of forces, when the driving member 45 is rotating substantially at or above the control speed, slipping frictional gripping between the friction pads 69 and friction surface 57 occurs rather then direct frictional engagment. Accordingly, this controlled slippage within the mechanism 15 allows the available clutch torque transmitted by the clutch to be delivered to the accessories only at the limited speed. Moreover, because of the counteraction of forces, there is always slipping frictional engagement within the mechanism 15, not complete disengagement, during rotation of the member 45 at speeds above the control speed. The fact that mechanism 15 is a centrifugally, partially disengaging mechanism allows continuous maintenance of the above-described bearing journalling between the plural pads 69, the driving member 45, and the driven member 47. It is to be understood that varying of the maximum control speed may be accomplished by altering the spring force developed by flat springs 73, or by varying the number, weight, or effective radius of the friction pads 69.

In overall operation of the speed-responsive mechanism 15 of the speed-limiting accessory drive system of this invention, during lower rotational speeds of the driving member, the accessories are simultaneously driven at the same rotational speed. As the rotational speed of the driving member 45 approaches the design control speed, controlled slippage within the mechanism 15 occurs allowing the driven member to maintain and limit the accessory speeds at this control speed regardless of the increasing rotational speed of the driving member 45 above that control speed. As the engine slows back down to the control speed, the centrifugal forces acting on the friction pad 69 are diminished until the energization bias of the flat springs 73 re-establishes direct frictional engagement between the friction pad 69 and the mating surface 57 wherein the mechanism 15 again rotates as a locked unit.

As noted above, the combination of the utilization of the associated engine's liquid coolant to provide direct lubrication and heat dissipation and the utilization of a preferred materials for the mating pieces of the mechanism results in minimum wear of the frictional elements. Accordingly, the magnitude of the spring compression in each of the flat springs 73 is substantially the same throughout the entire life of the mechanism 15 assuring that the design control speed remains substantially constant. This is an important feature since lack of pad wear in this invention eliminates the prior art problem of accommodating for friction pad travel and lack of uniform spring energization forces. The latter was accomplished in prior art devices through use of helical springs. It will be noted that in this invention, utilization of flat springs provides a minimal overall package size for the assembled speed-responsive mechanism. Furthermore, coolant lubrication in this invention eliminates the substantial noise of dry prior art devices, and promotes self-journalling.

There is illustrated in FIGS. 5 and 6, a second form of the preferred embodiment of this invention, denoted generally by reference numeral 95. Furthermore, like reference numerals in FIGS. 2, 3 and 4 and FIGS. 5 and 6 denote like elements. It will be noted that the primary differences between the first and second forms reside in the fact that the second form has a centrifugally engaging, wet, free-cranking mechanism and intermediate drive means in addition to the above described centrifugally partially disengaging, wet mechanism. The fact that this second form is utilized primarily to reduce the torque required to turn over an engine during cranking through disengagement of the accessories will become obvious as the description progresses.

Securely connected to the drive shaft 13 via the key 51 and the bolt 49 is a driving rotor 97 having a drum-shaped peripheral section 99. A freely rotatable intermediate drive sleeve 101 is interposed between the driving rotor 97 and the driven member 47. Carried and supported by the driving rotor 97 and interposed between drive sleeve 101 and the rotor 97 are plural friction elements 103 urged inwardly for retention within harbor boxes 105 of the driving rotor 97 by a garter spring 107. Axial alignment of the plural friction elements 103 and the driving rotor 97 is assured by coaxial alignment of a spring channel 109 on the friction element 103 and a spring channel 111 formed on the driving rotor 97. The plural friction elements 103 are grooved in a similar fashion as plural friction pads 69. The intermediate drive ring 101 has an inner friction surface 113 and an outer friction surface 115 adapted to be directly frictionally engaged with the friction element 103 and the friction pads 69, respectively.

Turning now to a discussion of the operation of this second form of the preferred embodiment, it will be noted that, because to the inwardly directed energization forces imposed on the plural friction elements 103 by the garter spring 107, during lower rotational speeds of the driving rotor 97 and of the plural friction elements 103 carried thereby, there is neither direct nor slipping frictional engagement between the driving rotor and the intermediate drive sleeve 101 yet the driving rotor 97, similar to the driving member 45 of the first form of the preferred embodiment, substantially bearingly supports the sleeve 101, and thus also the driving member 47. Thus, the garter spring 107 prohibits the mechanism 95 from engaging the accessories to the engine during cranking of the latter. Accordingly, the engine starting motor need not drive the accessories during engine starting. This can mean a significant reduction in required cranking torque if the liquid within an accessory has partially solidified in winter weather, or an accessory was left turned on when the engine was last shut off. By the time the engine has started and reached its idling speed, the centrifugal forces acting on the plural frictional elements 103 will have expanded the garter spring 107 thereby allowing all the remaining elements of the mechanism 95 to rotate in locked frictional engagement to transmit full engine torque and speed to the associated accessories. It may be noted that once the friction elements 103 have directly frictionally engaged the intermediate drive sleeve 101, the entire mechanism 95 rotates as a locked unit because the intermediate drive sleeve 101 is also directly frictionally engaged against the plural friction pads 69 of the outer centrifugally partially disengaging, wet mechanism due to the inward forces of the plural flat springs 73. Since this outer mechanism is common to both forms of the preferred embodiment of this invention, this second form operates similarly to the first form at rotational speeds above cranking speeds. Once the engine is stopped and the centrifugal forces acting on the plural friction elements 103 have ceased, the garter spring 107 reestablishes inward energization on the elements 103 and the driving rotor 97 is again disengaged from the drive sleeve 101. Accordingly, the engine starting motor will not have to turn over the accessories the next time the engine is started.

A modification to this second form of the preferred embodiment eliminates the garter spring 107 whereby at engine cranking speeds there is partial, albeit little, frictional engagement (as well as bearing support) between the friction elements 103 and the intermediate drive sleeve 101. The resultant torque penalty on the cranking mechanism is minimal, however, since there is effectively free cranking because of the substantial slippage between the elements 103 and the sleeve 101. This is merely a design choice and does not materially affect the operating characteristics of the centrifugally engaging mechanism of this second embodiment.

The above description emphasizes how this invention eliminates various prior art problems such as excessive accessory size, wear and power consumption by limiting the accessory drive speed and utilizing the engine's liquid coolant. Also eliminated are the complexity of parts and bearing arrangements which are costly to manufacture and maintain as well as the noise generated in exposed air-cooled clutch devices.

From the foregoing description of the two forms of the preferred embodiment of this invention, it will be obvious to one skilled in the art that various changes, modifications and substitutions of equivalents can be made in the construction of the described speed-responsive torque-transmitting and energy diverting and dissipating mechanism for a speed-limiting accessory drive system without departing from the scope of this invention.

I claim:

1. A centrifugally-actuatable, speed-limiting mechanism for the transmission of torque, comprising: a driving member and a driven member, said driven member being interposed about said driving member for coaxial rotation therewith, said driving member having a cylindrical frictional surface adjacently opposing an interrupted mating journalling surface on said driven member; centrifugally actuatable frictional pad means interposed between said members and carried by said driven member; means biasing said pad means against predetermined centrifugal forces acting thereon, whereby said pad means are operable to partially disengage said driven member from said driving member above a predetermined rotational design speed of said mechanism; said cylindrical frictional surface further characterized by being adapted to provide substantially all of the bearing journalling support of said driven member and further provide frictional resistance to said carried frictional pad means during torque transmission between said members; seal means operable to seal said driven member about said driving member; circulation means operable to circulate a liquid lubricant and coolant completely throughout said mechanism, and external cooling means communicating with said circulation means for effecting cooling of said circulated liquid lubricant and coolant.

2. In a centrifugally-actuatable, speed-responsive mechanism for the tranmission of torque to the accessories associated with an internal combustion engine, including concentrically-mounted driving and driven members capable of relative coaxial rotation and centrifugally responsive means interposed between said members for frictionally coupling the same in response to predetermined centrifugal forces acting on said centrifugally responsive means, the imporovement comprising: a drum-shaped driving member having an outer cylindrical clutch and journalling surface formed thereon, a drum-shaped driven member frictionally coupled with and bearingly supported by said surface, a plurality of friction pads interposed between said surface and said driven member and movably retained by the latter, the engagement of said plurality of pads and said cylindrical clutch and journalling surface providing substantially the sole means for supportively journalling said driven member about said driving member, spring means urging said retained friction pads radially against said clutch and journalling surface, enveloping means mounted on said driven member for hermetically sealing said driven member about said driving member, liquid medium means circulating within said enveloping means for effecting cooling and lubrication of said clutch and journalling surface and for suppressing frictional noise created thereat, and means externally of said enveloping means and communicating therewith operable to effect cooling of said circulated liquid medium means.

3. A self-journalling, centrifugally-operable, speed-responsive mechanism for the transmission of torque, comprising in combination: a driving member having a cylindrical bearing and frictional surface at its outer periphery, a driven member mounted outwardly of said driving member operable to coaxially rotate therewith, spring means mounted on said driven member, centrifugally actuatable friction elements movably carried by said driven member and radially biased by said spring means, said elements operable to frictionally couple said member, said cylindrical bearing and frictional surface of said driving member simultaneously being operable to frictionally engage and bearingly support said carried friction elements whereby said driving member provides substantially all of the bearing support of said driven member through the frictional engagement and bearing support of said carried friction elements, said driven member having means for forming a sealed chamber about said driving member, liquid lubricant and coolant means flowing within said sealed chamber, circulation means mounted on said sealed chamber operable to circulate said liquid lubricant and coolant throughout the same, and external cooling means communicating with said sealed chamber for dissipating the heat generated in said circulated liquid lubricant and coolant.

4. A centrifugally-operable, speed-responsive torque-transmitting mechanism comprising a drum-shaped driving member, a drum-shaped driven member mounted concentrically outward of said driving member for relative rotation therewith, sleeve bearing means interposed between said members comprising a cylindrical bearing and frictional surface formed on the outer periphery of said driving member, friction pad means interposed between said members and centrifugally operable to frictionally couple said members, said friction pad means being a part of and movably carried by said driven member, spring means operationally biasing said friction pad means for frictional and journalling engagement with said cylindrical surface of said driving member whereby said friction pad means and driving member are substantially fully journalled by said driving member, means mounted about said members for sealing the sleeve bearing means within an enclosed chamber, liquid lubricant and coolant means contained with said enclosed chamber, means connected to said enclosed chamber for effecting circulation of said liquid lubricant and coolant throughout the same, and means connecting said enclosed chamber to an external cooling system for cooling the circulated liquid lubricant and coolant thereby providing for the dissipation of heat generated within said mechanism.

5. In a centrifugally actuatable, speed-responsive mechanism for the transmission of torque, including concentrically mounted driving and driven members capable of relative coaxial rotation and having adjacently opposing cylindrical surfaces, and centrifugally responsive means interposed between said surfaces for frictionally coupling the same in response to predetermined centrifugal forces acting thereon, the improvement comprising: a first peripheral portion on one of the driving and driven members providing an uninterrupted cylindrical frictional surface, a second peripheral portion on the other member providing a cylindrical bearing surface periodically interrupted by recesses therein, the said surfaces operationally opposing one another; centrifugally activated friction pad means movably carried within said recesses, said carried pad means being operable to frictionally and bearingly engage said uninterrupted cylindrical frictional surface; resilient means mounted on said member having said second peripheral portion formed thereon and engaging said pad means for biasing the same against centrifugal forces acting thereon; said first and second portions and said pad means intercooperating to mutually provide substantially all of the journalling support between said members through the sliding bearing engagement of said interrupted bearing surface with said uninterrupted frictional surface and through said frictional and bearing engagement of said pad means with said uninterrupted frictional surface as operationally imposed by said resilient means and centrifugal forces;

means effecting a sealed interconnection between said portions whereby to provide a sealed chamber between the opposed surfaces thereof; liquid cooling and lubricant means completely filling said sealed chamber; circulation means operable to circulate said liquid coolant and lubricant means throughout said chamber and between said opposed surfaces; and means externally of said mechanism communicating with said sealed chamber operable to effect cooling of said circulated liquid coolant and lubricant means.

6. The invention of claim 5, wherein said driven member is concentrically mounted outwardly of said driving member, said first peripheral portion is formed on said driven member, and said second peripheral portion is formed on said driving member, whereby said resilient means operates to prevent said frictional and bearing engagement of said carried pad means with said first peripheral portion on said driven member below a predetermined rotational speed of the driving member.

7. The invention of claim 5, wherein said driven member is concentrically mounted outwardly of said driving member, said first peripheral portion is formed on said driving member, and said second peripheral portion is formed on said driven member, whereby said resilient means operates to effect controlled slippage between said carried pad means and said first peripheral portion on said driving member above a predetermined rotational speed of said driven member.

8. The invention of claim 7, including a freely rotatable, intermediate drive means interposed between said first and second peripheral portions respectively mounted on said driving and driven members, and friction elements carried in recesses formed in said first peripheral portion centrifugally operable to frictionally engage said intermediate drive means.

9. The invention of claim 8 including additional resilient means urging said carried friction elements away from said frictional engagement with said intermediate drive means.

10. The invention of claim 8, wherein said intermediate drive means is comprised of a cylindrically-shaped ring having inner and outer frictional bearing surfaces thereon.

11. A torque transmitting and energy diverting assembly for limiting the speed of accessories to be driven by an internal combustion engine, including a driving member rotatively driven off the crankshaft of an internal combustion engine, said driving member having a drum-shaped friction and bearing surface at its outer periphery, a cylindrically shaped driven member coaxially mounted outward of said driving member for rotation therewith, said driven member having driving connection with the engine accessories, at least one friction member supported by said driven member and entrapped between said driving and driven members so as to transfer tangential force loads therebetween, the drum-shaped friction and bearing surface on said driving member providing substantially the sole bearing journal support for said driven member, at least one spring means urging said friction member into non-slipping frictional engagement with said drum-shaped friction and bearing surface at lower rotational speeds of said driving member, said spring means operating to counteract centrifugal force developed on said friction member as the rotational speed of said driving member increases to and beyond a desired limited accessory speed, said spring means further being operable to cause controlled slipping and bearing engagement between said friction member and said drum-shaped friction and bearing friction surface when said driving member rotates above said limited accessory speed, said controlled slippage substantially effecting the limited output speed available to drive the engine accessories regardless of the rotational speed of said driving member above said limited accessory speed, seal means operable to seal said driven member about said driving member, liquid lubricant and coolant circulation means adapted to effect heat dissipation, noise suppression, and lubrication of said assembly by circulating a liquid lubricant and coolant throughout said sealed assembly, and cooling means operable to cool said circulated liquid lubricant and coolant.

12. The invention of claim 11, wherein said driving member comprises a driving rotor adapted to be connected to the output shaft of said engine, weighted friction pads carried by said driving rotor, and an intermediate drive sleeve disposed outwardly of said driving rotor and carried pads and bearingly supported thereby operable to coaxially rotate thereabout, said drive sleeve having at its inner periphery a cylindrically-shaped friction surface, said drive sleeve further characterized by having said drum-shaped friction surface formed at its outer periphery, said friction pads further characterized by being centrifugally operable to frictionally couple said intermediate drive sleeve to said driving rotor whereby at rotational speeds of said driving rotor and pads below the cranking speeds of said engine there is only minimal frictional coupling between said driving rotor and said intermediate drive sleeve thereby assuring only minimal rotary torque driving of said accessories by said engine during cranking speeds of the latter.

13. The invention of claim 12, (amended) including spring means urging said weighted friction pads toward said driving rotor to prohibit frictional coupling between said driving rotor and said intermediate drive sleeve thereby assuring non-engagement of said accessories to said engine during cranking of the latter.

* * * * *